Dec. 10, 1935.   W. E. RODLER   2,023,700
WAGON
Filed Sept. 21, 1933
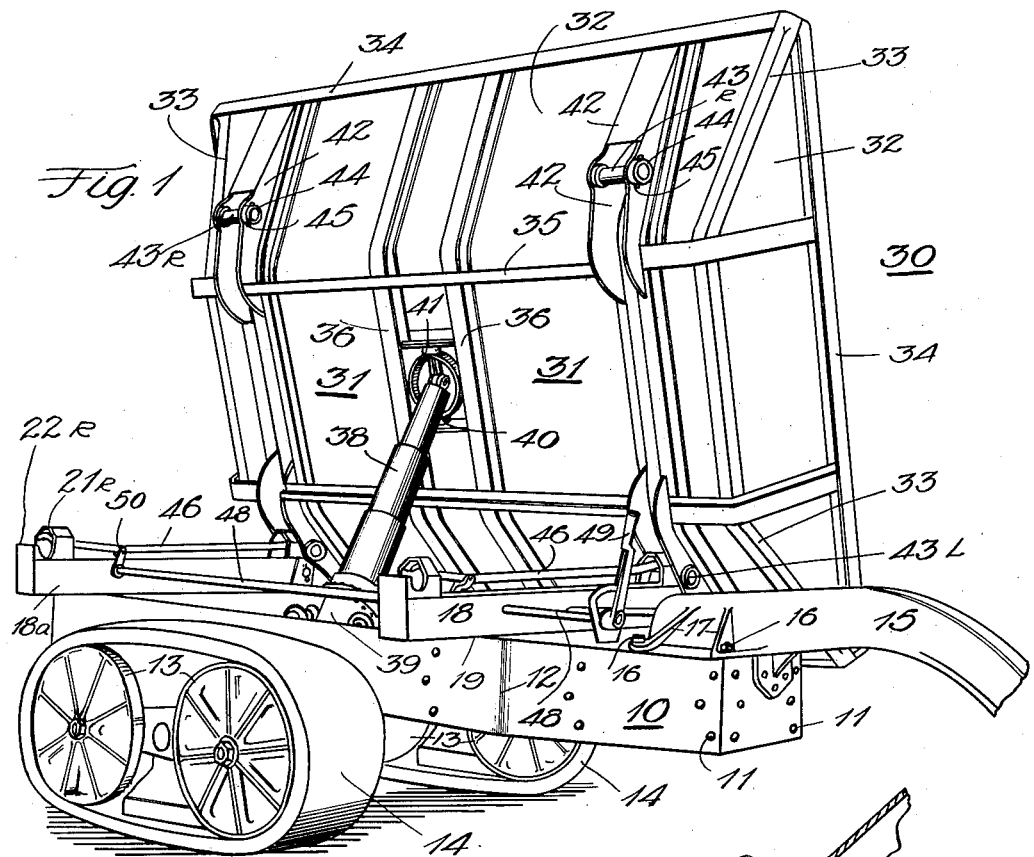
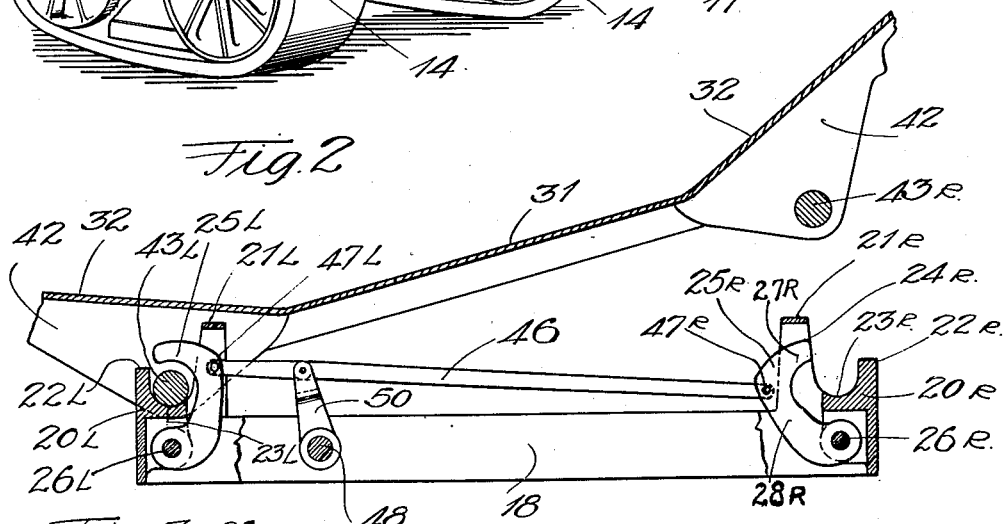
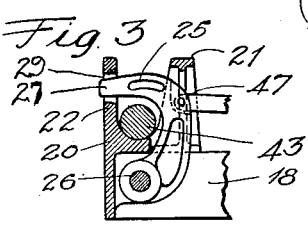
INVENTOR
WALDO E. RODLER
BY Flournoy Corey
ATTORNEY Patented Dec. 10, 1935

2,023,700

UNITED STATES PATENT OFFICE 2,023,700

WAGON

Waldo E. Rodler, Cedar Rapids, Iowa, assignor to La Plant-Choate Manufacturing Co., Inc., Cedar Rapids, Iowa, a corporation of Delaware Application September 21, 1933, Serial No. 690,389

2 Claims. (Cl. 298—18)

My invention relates to earth moving devices and more particularly to apparatus of the dump wagon or dump trailer type whereby bulk material such as dirt and the like may be hauled and which are adapted to be drawn by heavy duty tractors.

Wagons of this type are usually heavy and of large capacity so that it becomes necessary to employ a running gear of the endless tread type. A wagon employing such endless tread includes at least a pair of spaced wheels about which is arranged an endless tread linkage. The wheels are usually of a relatively small diameter, nevertheless a relatively large supporting surface is provided by the lower portions of the tread linkage. The body of a wagon, when supported by such an endless tread running gear is, by reason of the small diameter of the wheels, in a position relatively close to the earth thereby facilitating easy loading of the vehicle. The use of such an undercarriage for supporting the wagon in a position relatively close to the earth makes a bottom dump door undesirable for the reason that doors in the bottom of such wagons cannot be conveniently operated to efficiently discharge the material with which the wagon is loaded.

In road grading and the like, it becomes necessary to construct at least a temporary roadway over which a dump wagon may be pulled. The load carried by the bottom dump door wagon is then discharged in the very roadway so constructed, so that further movement of the discharged material therefrom is necessary to preserve the roadway. It is a purpose of my invention to avoid such additional movement of the discharge material. Furthermore there are also grading projects such as widening a filled portion, or dumping earth along the edge of an embankment, whereby the use of dump wagons of the drop-door type would be undesirable and impractical. Wagons constructed in accordance with my invention are known as the side-dump type.

Dump wagons have been constructed in the past which discharge material with which they are loaded at points other than the bottom thereof, and such wagons are known as the side-dump type. Such wagons of the past have been cumbersome and undesirable for the reason that the dumping operation required involved mechanism and entailed large manufacturing costs. I am concerned here with the problem of simplifying the mechanism for tilting the body of such wagon and particularly the means whereby direction of dumping of the material is established.

It is therefore an object of my invention to provide a wagon with simple means for discharging the material carried thereby to one side of the wagon.

Another object of my invention is to provide means for discharging the material with which the wagon is loaded to either side of the wagon.

A further object of my invention is to provide means whereby the load may be selectively dumped at either side of the wagon.

A more specific object of my invention is to provide a single actuating means for tilting the wagon body which means may be controlled by other means to selectively tilt the wagon body in either direction.

A still further object of my invention is to provide means for pivotally locking either side of the wagon body to the supporting frame thereof whereby the side of the wagon body which is not locked to the frame may be raised to discharge the contents carried therein.

Other and further features and objects of the invention will be more apparent to those skilled in the art upon a consideration of the accompanying drawing and the following description wherein a single exemplary embodiment of the invention is disclosed.

In the drawing:

Figure 1 is a general view in perspective of a dump wagon constructed in accordance with my invention.

Figure 2 is a view, partly in section and partly in elevation, showing the selective locking arrangement whereby the direction of dumping is established. The view is taken from the rear of the wagon, and Figure 3 is a detailed view partly in section and partly in elevation, showing a modified form of the locking hook arrangement.

Referring to the drawing, there is shown at 10, generally, an elongated frame of substantially rectangular shape. The frame 10 is constructed of channel iron with the side members and the end portions thereof rigidly secured to each other by means of rivets 11. It will be apparent that these parts may be secured to each other by means of bolts, or by welding the side and end members together. The front portions of the side members of the frame 10 converge slightly towards each other as shown at 12, whereby the front end of the frame is of a smaller width than the rear end thereof.

The frame is supported by running gear of the endless tread type. The running gear comprises a pair of spaced wheels 13 of relatively small diameter, about which is arranged an endless tread linkage 14. Such an endless tread is provided at each side of the frame 10. The running gear is secured to the frame in any well-known manner and the frame is thus supported so that it may be moved on the endless tread mechanism.

A curved draw-bar 15 is attached to the front end of the frame and the draw bar is rigidly secured to the frame by means of bolts 16, which cooperate with lug portions 17 extending from an integral part of the draw bar 15. The draw-bar 15 is formed from steel or similar material and is of a relatively large cross section so that the wagon may be pulled along the earth by a heavy duty tractor (not shown) which may be attached to the front end of the draw bar.

A beam 18 extends transversely across the frame near the front end thereof and adjacent the rear end of the draw bar 15. The beam 18 is of substantially square cross-section and is long enough to extend a short distance beyond the side members of the frame 10. This beam 18 is adapted to rest on the uppermost edges of the side members of the frame, as indicated at 19, and is secured thereto by any suitable means. A similar beam 18a extends across the frame 10 near the rear end thereof and this beam 18a is associated with the frame in a manner similar to the beam 18.

In the preferred form of my invention here described two of such beams are provided but it is apparent that additional beams may be utilized if desired. For instance, several other beams may be positioned across the frame intermediate of the beams 18 and 18a.

Referring now to Figure 2 of the drawing there is shown mounted at one end of the beam 18, a bearing 20R, the peculiar structure of which is hereinafter referred to as an open-throated bearing or socket.

The bearing 20R may be considered as substantially of U-shape. The bearing 20R is mounted at the right end of the beam 18 with the legs of the U portion extending in a vertical direction. An inner leg of the bearing, designated as 21R, extends in a vertical direction to a point above the end of the outer leg 22R. The inner surface 23R of the bearing is machined so as to form a smooth arcuate surface for a purpose hereinafter set forth.

An aperture 24R is provided in the longer leg 21R of the bearing 20R, and a hook member or latch 25R is mounted within this aperture so that the hollow portion of the leg 21R embraces the hook member. The hook 25R is pivotally mounted to swing about a shaft 26R. The shaft 26R is positioned below the bearing 20R and the ends of the shaft are engaged in lugs formed from an integral part of the bearing structure.

The hook 25R is formed with a relatively long, substantially straight, portion 28R with the lower end slightly curved and a shorter tip portion 27R extending substantially at a right angle from the straight portion 28R. The hook 25R is pivotally mounted on the shaft 26R with the tip portion 27R extending in the direction of the bearing leg 22R. The under surface of the tip 27R is arcuate shaped, so that this surface may engage the curved surface of the shaft 43R.

The shape of the hook or latch 25, in general, is such that when the hook is in a position, shown in Figure 3, the shaft 43 will be locked in the leg portions of the bearing. The position of the shaft 26 and the tip portion 27 of the hook 25 is arched so that any tendency of the shaft 43 to move upwardly will not cause the hook 25 to be rotated about the shaft 26.

A bearing of the above described type and of similar construction, is positioned at the opposite end of the beam 18, but it is mounted in a reversed relation, that is to say, the bearing 20R, at the right side of the frame, is mounted with the hook-embracing legs 21R on the inner side of the wagon, while the bearing 21L at the left side of the wagon, is mounted in reversed relation with its longer or hook embracing leg 21L also on the inner side of the wagon.

The beam 18a, located near the rear end of the frame, is provided with a similar pair of open-throated bearings and these bearings are associated with the beam 18a in a manner similar to the mounting of the bearings above described in connection with the beam 18. Bearings are thus provided at four points on the frame structure and the bearings at each side of this frame structure are in alignment, by reason of the fact that the beams 18 and 18a are of equal length, and because each beam extends beyond the side of the frame an equal distance.

There is shown at 30, generally, a body box or hopper of rectangular shape. The body or hopper 30 is shown in a tilted position in Figure 1 in order that the supporting frame and tilting mechanism may be properly illustrated. The body 30 is, of course, normally supported in a horizontal position so that bulk material or articles may be carried therein.

The lowermost portion 31 of the body is rectangular in shape, and the dimensions thereof are substantially the same as a rectangle having the four open-throated bearings or sockets 20R and 20L as corners. The sides 32 of the body 30 are flared and slope upwardly and outwardly from the rectangular bottom portion 31. The hopper 30 is constructed of heavy sheet material and the sides are cut angularly at the four corners and joined to each other by means of plates or angle irons 33. The upper edge of the hopper, on all four sides, is turned over and downward, as shown at 34, to form a flange which functions as a reinforcing means. The body 30, including the sides 32, is reinforced by means of longitudinally and transversely extending beams 35 and 36 in accordance with the usual practice.

A hydraulic jack 38, of the telescopic type, shown in extended position in Figure 1, is mounted in the center of the frame 10. The lower and larger end 39 of the jack is pivotally mounted in trunnion bearings in a manner such that the upper end 40 of the jack may swing to either side of the frame 10. The upper end of the hydraulic jack is attached to the central under-portion 31 of the body, by means of a universal joint structure 41 which in turn is attached to the reinforcing beams 36.

The body 30 is provided on its under side with a plurality of downwardly-extending plates 42 of substantially triangular shape. Two of these plates project downwardly in a parallel relation from each of the four corners of the body near the point where the bottom 31 and the sides 32 meet. Shaft-like members or bearing pins 43 connect each pair of parallel plates near the lowermost parts thereof and the shafts 43 are held in engaged relation therewith by means of a plurality of collars 44 on the outer ends thereof. The collars are pinned by means of pins 45.

The shaft-like members or bearing pins 43 are so positioned that when the hopper 30 is in a horizontal position, the bearing pins will rest in the bearings or sockets 20R and 20L and the body 30 will thus be supported in a load carrying position. The diameter of the shaft-like members 43 is such that they engage the arcuate surfaces 23R and 23L of the respective bearings, in a relation that will permit the shafts to turn therein.

The hook members 25R and 25L, associated with the bearings at each end of the beam 18, are connected by a rod 46. The rod 46 is pivotally secured to the hook 25R at a point 47R, and the opposite end of the rod 46 is in a like manner secured to the hook 25L by a pivot 47L. A similar connecting rod 46 is associated with the hooks in the bearings mounted on the beam 18a. The connecting rods 46 are of such length that when the hooks 25L are swung to the left, as shown in Figure 2, the open throats of the bearings 20L will be substantially closed to hold the shafts 43L therein, while the hooks 25R, at the opposite side of the wagon or the opposite end of the beams, will be in a retracted position whereby the shafts 43R may escape from the legs of the bearing 20R.

A shaft 48 extends through a suitable opening in the beam 18a, along the length of the frame 10, through another suitable opening in the beam 18, and to a point in front of the beam 18. The shaft 48 is adapted to be rotated in the openings by a lever 49 attached to the front end of the shaft 48.

A pair of levers 50 connect the shaft 48 to each of the connecting rods 46 at points adjacent the beams 18 and 18a and the hook members 25R and 25L may therefore be actuated by movement of the lever 49. It will be apparent that when the lever 49 is moved to a position indicated in Figure 1, the hooks 25L are moved towards the legs 22L of the bearings at the left side of the wagon and the shafts 43L are then locked in these bearings. When the lever 49 is moved to an opposite extreme position the hooks 25L will be retracted and the hooks 25R will engage the shafts 43R and thus lock these shafts in their respective bearings.

The wagon body, when in a normal or loading position, is supported by the shafts 43L and 43R resting in the open-throated bearings 20R and 20L. The direction in which the body 30 is to be tilted, is established by the position of the lever 49. For instance, if the lever 49 is in the position as shown in Figure 2, the shafts 43L will be pivotally secured in the bearings 20L and, by applying sufficient fluid pressure to the hydraulic jack 38, the center portion of the body will initially be moved upwardly. The left side of the body, however, will not be raised since the hook members 25L are then in a position to lock the shafts 43L in the open-throated bearing 20L. Further extension of the hydraulic jack will cause the body to swing upward and to the left side of the frame, because the shafts 43L are pivotally retained in the bearings 20L, and thus any material carried by the body is discharged to the left side of the body.

The wagon body may be tilted to the right side of the frame, from a load carrying position, by swinging the lever 49 into an opposite position from that above indicated, and thus locking the shafts 43R in the bearings 20R. The same movement of the lever 49 simultaneously releases the shafts 43L from their locked position in the bearings 20L. An upward extending movement of the hydraulic jack 38 will cause the shafts 43R to be rotated in the bearings 20R and the body will then swing upward and to the right and thus the material with which the body may be loaded will be discharged to the right side of the vehicle.

A modified form of hook and bearing structures is shown in Figure 3. The legs 21 and 22 of the U-shaped bearing, in this embodiment of the invention, are of substantially equal length. An opening 29 is provided in the leg 22 at a point above the uppermost surface of the shaft 43. The tip portion 27, of the hook, has a greater length in this modification and the end thereof is adapted to pass through the opening 29. The tip portion 27 will be reinforced by the engagement of the end thereof with the upper wall of the opening 29 and thus prevent the tip portion from becoming distorted.

Although I have described certain preferred embodiments of my invention, it is apparent that modifications may be made by those skilled in the art. Such modifications may be made without departing from the spirit and scope of my invention as set forth in the appended claims.

I claim as my invention:

1. A dump wagon comprising an elongated frame having side members and end portions, a pair of U-shaped bearings carried by said frame, one of said bearings being positioned at each side of said elongated frame, a body, a pair of shaft-like members carried by said body, one of said shaft-like members being adapted to be received in each of said bearings and thereby support said body, a pair of pivotally mounted hooks, one of said hooks being associated with each of said bearings in a reversed relation therewith, said hooks being adapted to be pivotally moved to a position to close the respective leg portions of said bearings, a rod connecting said hooks, a lever associated with said connecting rod adapted upon operation thereof to move one of said hooks to a position to retain one of said shaft-like members in its respective bearing and the other of said hooks being simultaneously moved to a retracted position thus permitting the other of said shaft-like members to escape from its respective bearing.

2. A locking device, comprising a U-shaped bearing, one leg of said bearing having an aperture therein, a shaft normally resting in said bearing, a hook pivotally mounted on the bearing below the U portion thereof, said hook having a relatively long straight portion and a shorter tip portion, the tip portion of said hook adapted to be moved to a position with the end thereof within said aperture whereby said shaft is locked in said bearing.

WALDO E. RODLER.